United States Patent [19]

Shimanaka

[11] Patent Number: 4,949,595
[45] Date of Patent: Aug. 21, 1990

[54] LINE PRESSURE CONTROL ARRANGEMENT FOR AN AUTOMATIC TRANSMISSION

[75] Inventor: Shigeki Shimanaka, Hadashino, Japan

[73] Assignee: Nissan Motor Co., Ltd., Yokohama, Japan

[21] Appl. No.: 387,286

[22] Filed: Jul. 31, 1989

[30] Foreign Application Priority Data

Aug. 1, 1988 [JP] Japan .................................. 63-190536

[51] Int. Cl.$^5$ ............................................. B60K 41/18
[52] U.S. Cl. ........................................ 74/866; 74/867
[58] Field of Search .................................. 74/866, 867

[56] References Cited

U.S. PATENT DOCUMENTS 4,266,447  5/1981  Heess et al. ............................ 74/858
4,742,461  5/1988  Eschrich et al. .................. 74/867 X
4,779,491 10/1988  Fujiwara et al. .................. 74/867 X
4,787,272 11/1988  Taga et al. ............................ 74/867
4,791,568 12/1988  Hiramatsu et al. ................ 74/867 X
4,843,922  7/1989  Kashihara .......................... 74/867 X

OTHER PUBLICATIONS

Nissan Full-Range Automatic Transmission Re4R01A Type, Service Manual, (A261C07) issued on Mar. 1987, by Nissan Motor Company Limited.

*Primary Examiner*—Dirk Wright
*Attorney, Agent, or Firm*—Foley & Lardner, Schwartz, Jeffery, Schwaab, Mack, Blumenthal & Evans

[57] ABSTRACT

A line pressure control arrangement includes a self-adjust function which prevents the updating of the line pressure control during no-load shifts or uses different target times for no-load (power off) and positive load (power on) shifts.

4 Claims, 6 Drawing Sheets

LINE PRESSURE CONTROL ARRANGEMENT FOR AN AUTOMATIC TRANSMISSION

BACKGROUND OF THE INVENTION

1. Field of the Invention

The present invention related to a power train which includes a prime mover in the form of an engine and a transmission which is operatively connected therewith and more specifically to a line pressure control arrangement which features a self-adjust function which is carried out only during power on shifts.

2. Description of the Prior Art

An automatic transmission Service Manual (publication A261C07) issued in March 1987 relating to the so called RE4RO1A type transmission describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

However, the solenoids used for the purposes of line pressure control and the friction elements used in a given transmission, inevitably exhibit a unit to unit variation and/or exhibit a change in characteristics with the passing of time due to wear and the like deterioration. These changes and/or unit to unit variations cannot be compensated as it not possible to change the line pressure control valve duty cycle.

Accordingly, the control characteristics tend to deteriorate to the point of permitting strong shift shocks and/or excessive friction element slippage which shortens the working life of the friction elements per se.

SUMMARY OF THE INVENTION

In an effort to control the level of line pressure to an optimal level, it has been proposed to include a self-adjust function which monitors the amount of time required for a shift to be completed during upshifts and to compare this time with a target value which has been determined to occur when an optimal level of line pressure is used. Using the difference between the times the level of line pressure has been changed in a direction which tends to reduce the time difference to zero.

However, with this type of approach it has been found that the correction during no-load upshifts tends to adjust to the level of line pressure to one which is insufficient for positive load upshifts, and has lead to the problem that excessive friction element slippage tends to occur.

Accordingly, it is an object of the present invention to a line pressure control arrangement which includes a self-adjust function but which prevent the updating of the line pressure control during no-load shifts or to use different target times for no-load and positive load shifts.

More specifically, a first aspect of the present invention is deemed to comprise a power train including an engine and transmission operatively connected with the engine, the transmission including means for selectively applying line pressure to friction element of the transmission in order to select predetermined gear ratios, the powertrain featuring: line pressure self-adjust means for adjusting the level of line pressure in accordance with the difference between the time required for an upshift and a target time of the shift; means for detecting a power off upshift which occurs when the transmission undergoes an upshift with the engine operating under no load; and means for inhibiting the self-adjust function when a power off upshift takes place.

A second aspect of the present invention is deemed to comprise a power train including an engine and transmission operatively connected with the engine, the transmission including means for selectively applying line pressure to friction element of the transmission in order to select predetermined gear ratios, the power train featuring: line pressure self-adjust means for adjusting the level of line pressure in accordance with the difference between the time required for an upshift and a target time of the shift; means for detecting a no-load upshift; means for switching the target time from a target time suitable for power on upshifts to a time suitable for power off upshifts.

DETAILED DESCRIPTION OF THE EMBODIMENTS

Figure 1:
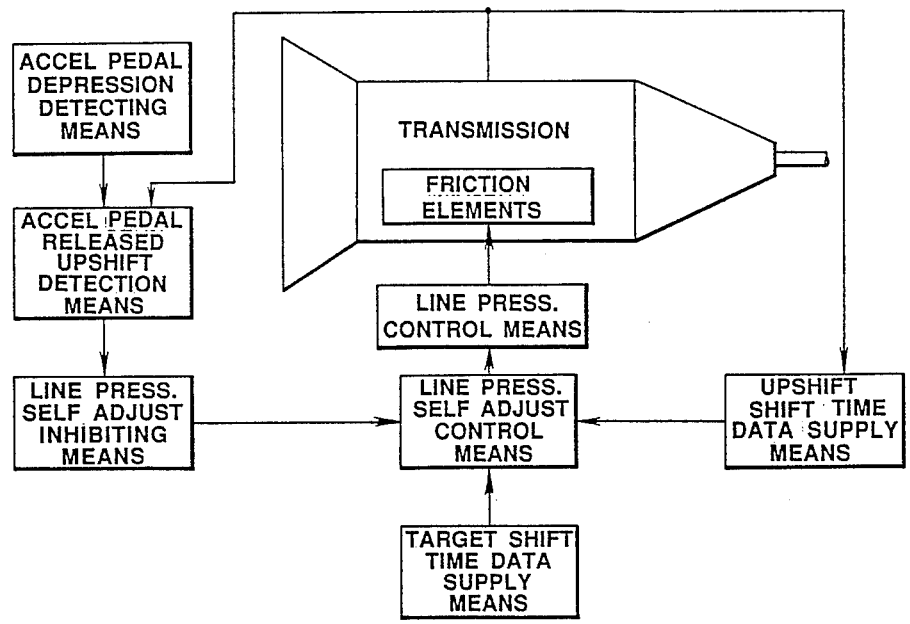
FIGS. 1 and 2 are block diagrams which illustrate the various conceptual arrangements which are included in the present invention.
Figure 2:
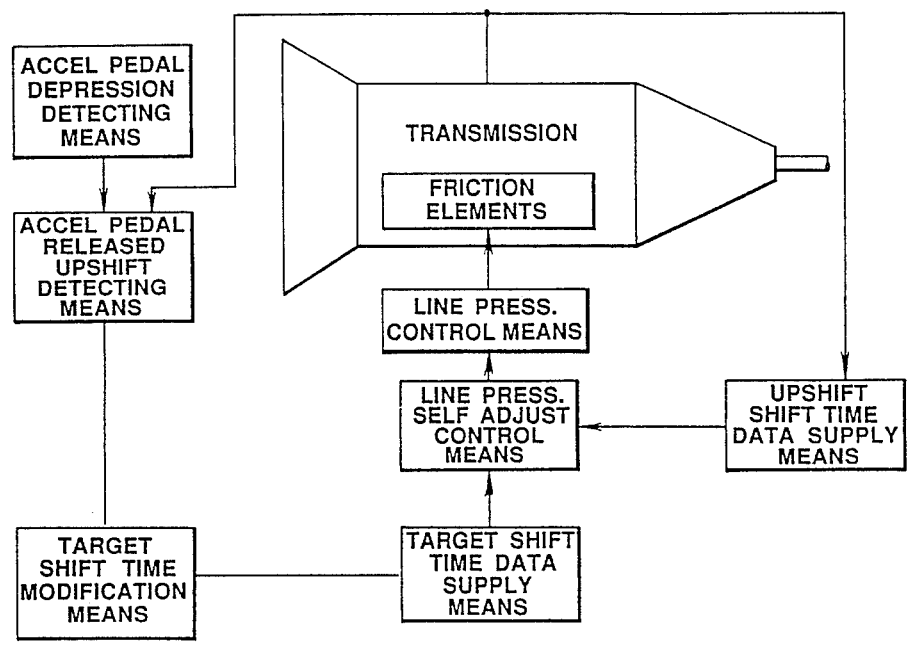
Figure 3:
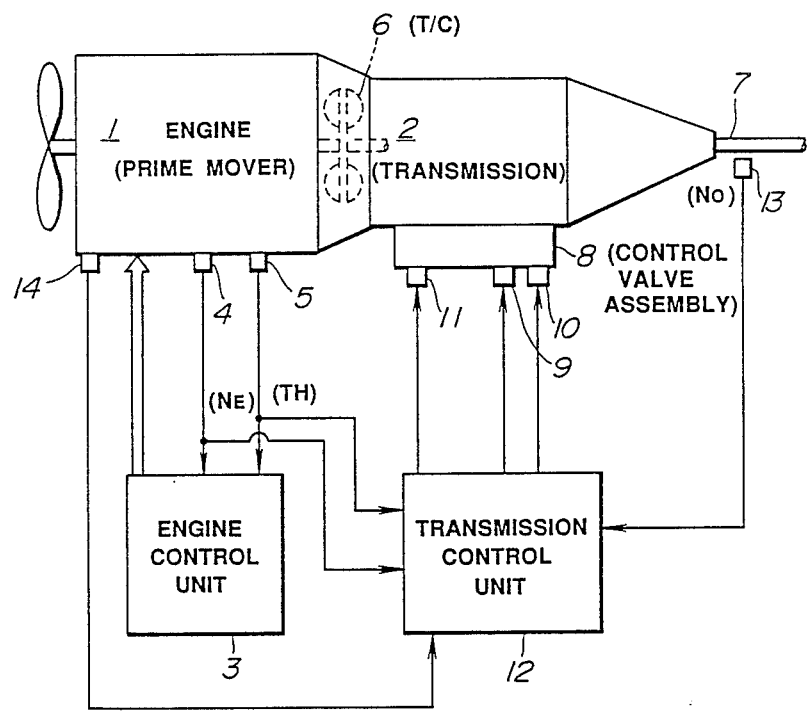
FIG. 3 is a schematic diagram showing an engine system to which the embodiments of the present invention are applicable.

FIG. 3 shows a power train to which an embodiment of the present invention is applied. In this arrangement an electronically fuel injected internal combustion engine 1 is operatively connected by way of a torque converter 6 to a transmission 2.

It should be understood that even though FIG. 3 shows a F-R type power train (front engine—rear wheel drive) the present invention is not limited to the same and can be applied to FF, MR or four-wheel drive 4WD type arrangements if so desired.

The engine control system includes an engine control unit 3 which is supplied inputs from an engine speed sensor 4 and a throttle position sensor 5, Based on the inputs of sensors 4 and 5, the engine control unit 3 which in this instance includes a microprocessor (not show), derives the appropriate injection control pulse width and applies the same to the fuel supply system of the engine.

In this embodiment, the transmission 2 comprises (merely by way of example) a RE4RO1A type transmission developed by NISSAN MOTOR CO. LTD., the construction and arrangement of which is described in detail in the Service Manual A261C07 published by the above mentioned company.

A transmission output shaft 7 provides a drive connection between the differential or final gear (not shown) and the transmission.

The transmission is provided with a transmission control unit 12 which also includes a microprocessor. This unit 12 is arranged to issue control signals to a control valve assembly 8 which forms part of the transmission. The control valve assembly 10 includes three solenoids 9, 10 and 11.

In this embodiment the transmission includes a gear train comprising a plurality of planetary gear units, and associated hydraulically operated clutches and brakes (not shown). The brakes and clutches are operated by the supply of line pressure which is selectively supplied from the control valve assembly 8.

Depending on the energization of solenoids 9 and 10, the transmission is conditioned to selectively produce a number of different gear ratios by selectively inducing line pressure to be supplied to the appropriate friction elements.

In this instant arrangement four forward gear ratios of the transmission can be produced in the manner indicated in the table below.

TABLE 1

| GEAR | FIRST | SECOND | THIRD | FOURTH |
|------|-------|--------|-------|--------|
| SOL. 9 | ON | OFF | OFF | ON |
| SOL. 10 | ON | ON | OFF | OFF |

The third solenoid 11 of the control valve unit 8 is arranged to be operated on a variable duty cycle and to control the level of the line pressure.

The transmission control unit 12 is arranged to receive a data input No from a rotational speed sensor 13. As will be appreciated from the drawings No is indicative of the rotational speed of the transmission output shaft 7. The transmission control unit 12 is further arranged to receive data inputs from the engine speed sensor 4 and the throttle position (engine load) sensor 5.

Based on the data input from the above mentioned sensors the transmission control unit 12 outputs suitable control signals to the the solenoids 9, 10 and 11. This unit further derives and outputs a torque variation control signal Td (in this case a torque reduction or so called "torque down" signal) to the engine control unit 3.

In response to this torque down signal the engine control unit can reduce the amount of fuel supplied to the engine by cutting the supply to selected cylinders for example or by modifying the ignition timing. For further information relating to techniques of implementing the above described torque down control, reference may be had to U.S. Pat. No. 4,266,447 which was issued on May 12, 1981 in the name of Heess et al.

Figure 4:
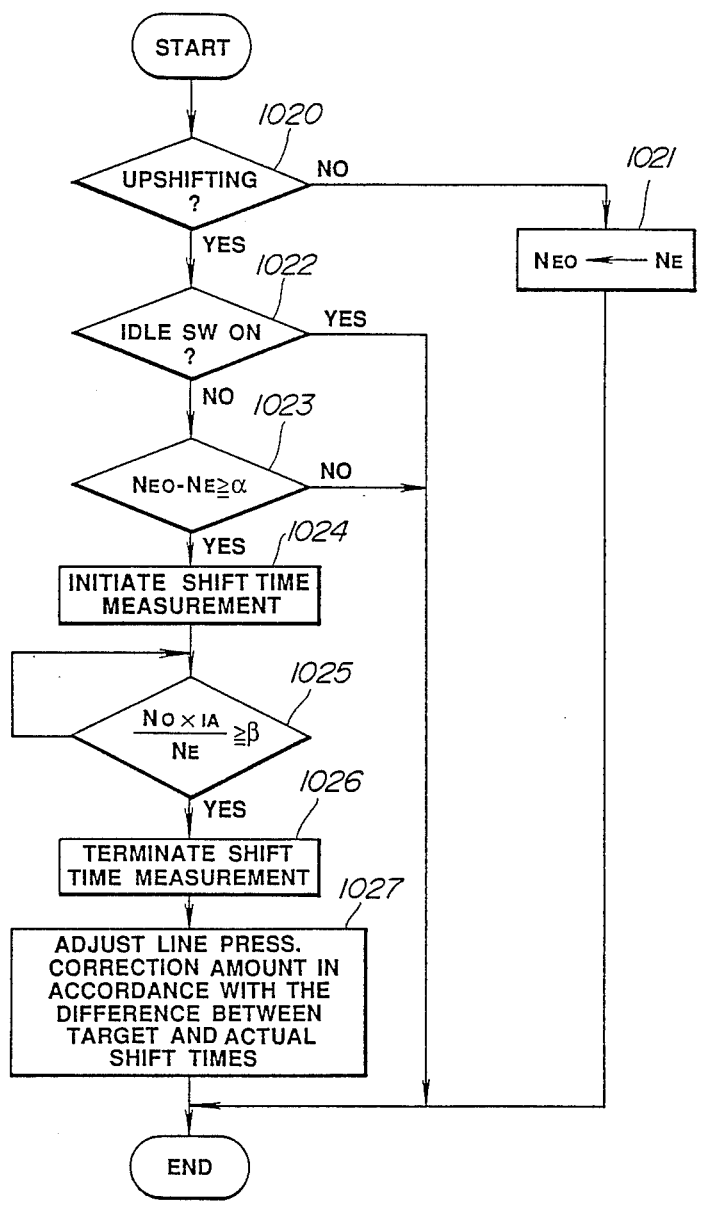
FIG. 4 is a flow chart depicting the steps which characterize a routine which performs self-adjust and self-adjust inhibit functions in accordance with engine speed, transmission output shaft rotational speed and engine load input data in accordance with a first embodiment of the present invention.

FIG. 4 shows a control routine which is run in accordance with a first embodiment of the present invention. In this arrangement the engine load is determined by sampling the status of an idle switch and only if a positive engine load is indicated is the self-adjust function implemented.

Figure 6:
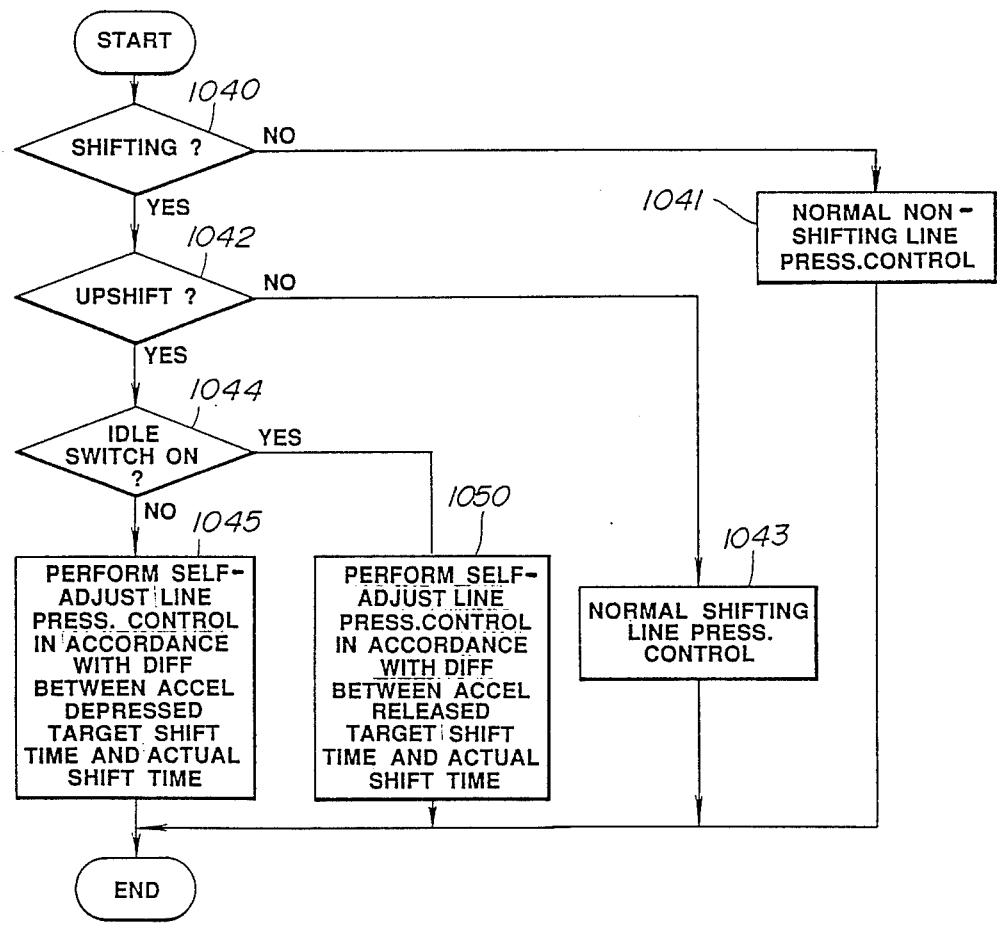

In more detail, the first step 1020 of the routine shown in FIG. 6 is such as to determine if the transmission is undergoing an upshift or not. This decision can be made by sampling decisions made by a shift control routine which utilizes vehicle speed and engine load and which compares the instant gear with that which is indicated by the instant speed and load levels in order to determined which shift should be made and via which particular resetting of the shift solenoid settings, the required shift can be put into effect.

For further details concerning the above type of shift control routine and the manner which which such decisions are made, reference can be had to copending U.S. patent application Ser. No. 07/330,129 filed on Mar. 29, 1989 in the name of Narita, and still pending. The content of this document is hereby incorporated by reference thereto.

In the event that the transmission is not undergoing an upshift then the routine flows across to step 1021 wherein the instant engine speed Ne is written into memory as Neo (a value used to determine the timing of a shift initiation. On the other hand, if an upshift is indicated the routine flows to step 1022 wherein the status of the idle switch 14 is checked. If the idle switch is closed the routine ends while in the case it is open (OFF) indicating a positive load on the engine, the routine flows to step 1023 wherein the rate at which the engine speed is changing is determined. As shown, this is done by comparing the difference between the instant engine speed and the value recorded in step 1021 with a predetermined value $\alpha$. If the rate at which the engine speed is changing does not exceed $\alpha$ then routines ends. On the other hand, if $\alpha$ is reached and/or exceeded then it is assumed that the shift has actually begun and the routine flows to step 1024 wherein the a shift timer (soft clock) is set counting and begin timing of the shift inertia phase.

At step 1025 the result derived from No x iA/Ne is compared with a predetermined value $\beta$ until such time it becomes equal to or exceeds the same. At this time it is assumed that the shift has been completed. Accordingly, at step 1026 the count of the shift timer is recorded and counter cleared ready for the next run. At step 1027 the count which has just been recorded is compared with a target value for the instant upshift and the difference noted. Note should be made that the shift time indicated by the count is the so called inertia phase time of the shift.

Based on the difference, a correction amount which is designed to very the duty which is applied to the line pressure control solenoid in a direction which will reduce the difference to zero is calculated. As the shift time approaches the target time, the level of line pressure assumes a value at which shift shock or friction element slippage is reduced.

Figure 5:
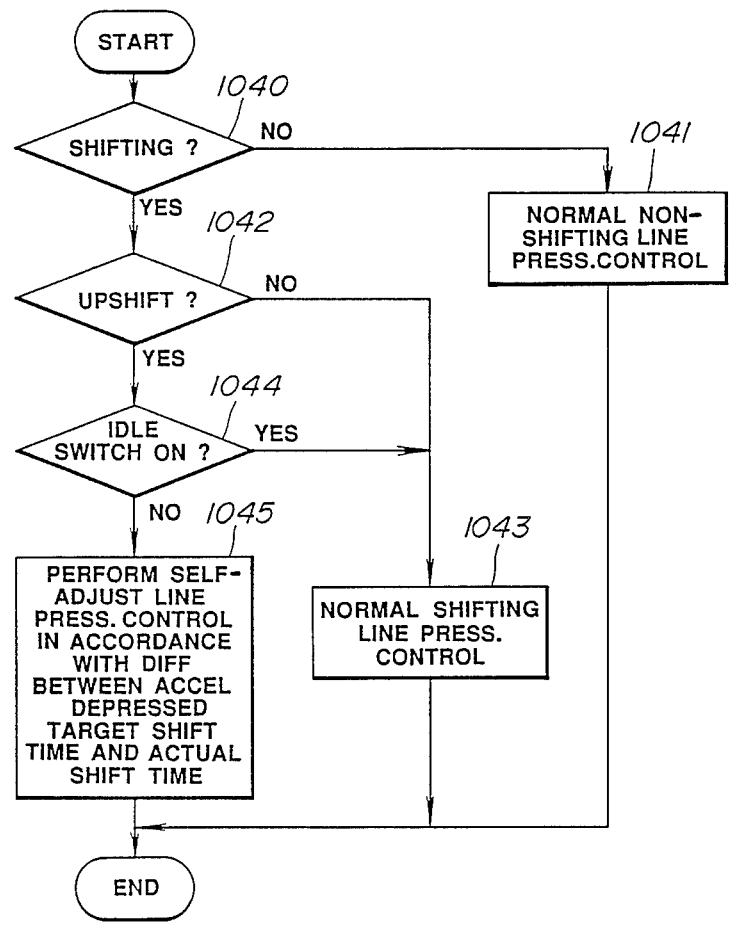
FIGS. 5 and 6 are a flow charts which shows the steps performed in accordance with second and third embodiments of the present invention.

FIG. 5 shows a second embodiment of the present invention. In this embodiment only during power on type up shifts is the self-adjust function permitted.

More specifically, the first step of this routine is such as to determine if the transmission is undergoing a shift or not. If a shift is not indicated then the routine flows to step 1041 wherein normal line pressure control is implemented. On the other hand, if a shift is being conducted then it is determined if the shift is an upshift or not. If the shift is a downshift, the routine flows across the step 1043 wherein normal line pressure control for shifting operations is conducted. However, in the case of an upshift the routine flows to step 1044 wherein the status of idle switch is determined. If the switch is closed (ON) the routine flows to step 1043 while in the case it is open (OFF) indicating a positive load or power on engine type operation, the routine flows to step 1045 wherein a line pressure adjust function is implemented. This step can include steps 1023 to 1027 disclosed in connection with the flow chart of FIG. 4.

FIG. 6 shows a flow chart which depicts the characterizing operations which are conducted in accordance with a third embodiment of the present invention.

This embodiment differs from the second in that in the case the engine is found to be operating under a no load condition in step 1044 the routine flows across to step 1050 wherein a self-adjust function is carried out using a target time suited for power off shifts (viz., shifts which occur with the accelerator in released position). In other words steps 1045 and 1050 use different target times for adjusting the level of line pressure.

As will be appreciated the above embodiments of the present invention are such as to obviate the problem wherein the self-adjust during power off shifts result in a reduced line pressure in the case of a power on shift.

What is claimed is:

1. In a power train including an engine and transmission operatively connected with said engine, said transmission including means for selectively applying line pressure to friction element of the transmission in order to select predetermined gear ratios, the arrangement comprising:

line pressure self-adjust means for adjusting the level of line pressure in accordance with the difference between the time required for an upshift and a target time of said shift.

means for detecting a power off upshift which occurs when the transmission undergoes an upshift with the engine operating under no load; and means for inhibiting the self-adjust function when a power off upshift takes place.

2. An arrangement as claimed in claim 1 wherein the self-adjust amount is held unchanged during said power off upshifts.

3. An arrangement as claimed in claim 1 wherein the level of the line pressure is controlled during power off upshifts to assume the same level as induced during non-shifting transmission operation.

4. In a power train including an engine and transmission operatively connected with said engine, said transmission including means for selectively applying line pressure to friction element of the transmission in order to select predetermined gear ratios, the arrangement comprising:

line pressure self-adjust means for adjusting the level of line pressure in accordance with the difference between the time required for an upshift and a target time of said shift;

means for detecting a no-load upshift;

means for switching the target time from a target time suitable for power on upshifts to a time suitable for power off upshifts.

* * * * *